US012679270B2

(12) United States Patent
Domeyer et al.

(10) Patent No.: US 12,679,270 B2
(45) Date of Patent: Jul. 14, 2026

(54) SYSTEMS AND METHODS FOR MANAGING DRIVER GLANCE BEHAVIOR

(71) Applicant: Toyota Motor Engineering & Manufacturing North America, Inc., Plano, TX (US)

(72) Inventors: Joshua E. Domeyer, Ypsilanti, MI (US); Benjamin Piya Austin, Saline, MI (US); Jason J. Hallman, Saline, MI (US); Danil V. Prokhorov, Canton, MI (US)

(73) Assignees: TOYOTA MOTOR ENGINEERING & MANUFACTURING NORTH AMERICA, INC., Plano, TX (US); TOYOTA JIDOSHA KABUSHIKI KAISHA (JP)

( * ) Notice: Subject to any disclaimer, the term of this patent is extended or adjusted under 35 U.S.C. 154(b) by 90 days.

(21) Appl. No.: 18/673,207

(22) Filed: May 23, 2024

(65) Prior Publication Data

US 2025/0360874 A1 Nov. 27, 2025

(51) Int. Cl.
B60Q 9/00 (2006.01)
G06T 7/70 (2017.01)

(52) U.S. Cl.
CPC ................. B60Q 9/00 (2013.01); G06T 7/70 (2017.01); *G06T 2207/30201* (2013.01); *G06T 2207/30232* (2013.01); *G06T 2207/30268* (2013.01)

(58) Field of Classification Search
CPC ...... G06V 20/597; G06V 40/19; G06V 20/00; G06V 30/00; G06V 40/00; G06V 2201/00; G06V 10/00; G06V 40/197;

B60Q 9/00; B60Q 9/008; B60R 11/04; B60R 2011/0003; G06F 18/24; G06F 1/163; G06F 9/4881; G06F 16/9538; G06F 16/9577; G06F 3/012; G06F 3/013; G06F 3/0481; G06F 3/1423; G06N 20/20; G06N 3/045; G06N 3/0464; G06N 3/08; G06N 3/09; G06N 5/01; G06N 3/00; G06N 5/00;

(Continued)

(56) References Cited

U.S. PATENT DOCUMENTS 6,974,414 B2    12/2005    Trent
7,978,086 B2    7/2011    Galley et al.
(Continued)

FOREIGN PATENT DOCUMENTS

WO    2019213177    11/2019

*Primary Examiner* — Daniel Previl
(74) *Attorney, Agent, or Firm* — Snell & Wilmer LLP

(57) ABSTRACT

Methods, systems, and apparatus for a driver monitoring system. The driver monitoring system includes an internal vehicle camera, an internal vehicle display, and an electronic control unit (ECU). When a driver enters the vehicle, a request (e.g., an agreement) can be displayed to the vehicle driver so as to prompt the vehicle driver to provide a driver input. In response to the vehicle driver providing the driver input, the ECU can adjust an allowable glance time. The ECU can be configured to determine, using the camera, that the eye position of the vehicle driver is such that a gaze direction of the vehicle driver is not toward a direction of travel of the vehicle for a duration that exceeds the adjusted glance time. In response thereto, the ECU can be configured to initiate a countermeasure to encourage a corrective response from the vehicle driver.

20 Claims, 5 Drawing Sheets

(58) Field of Classification Search

CPC .......... G06N 7/00; G06N 10/00; G06N 20/00; G06N 99/00; G06T 2207/20084; G06T 2207/30196; G06T 2207/30268; G06T 7/70; G06T 1/00; G06T 3/00; G06T 5/00; G06T 7/00; G06T 9/00; G06T 11/00; G06T 13/00; G06T 15/00; G06T 17/00; G06T 19/00; G06T 2200/00; G06T 2201/00; G06T 2207/00; G06T 2210/00; G06T 2211/00; G06T 2213/00; G06T 2215/00; G06T 2219/00; G06T 2207/30201; G06T 2207/30232; G06T 12/00; G09B 19/167; G09B 1/00; G09B 3/00; G09B 7/00; G09B 5/00; G09B 9/00; G09B 11/00; G09B 13/00; G09B 15/00; G09B 17/00; G09B 19/00; G09B 21/00; G09B 23/00; G09B 25/00; G09B 27/00; G09B 29/00; H04N 23/90; H04N 7/188; H04N 9/28; H04N 23/51; H04N 23/63; H04N 23/661; B26D 7/26; B60K 2360/1438; B60K 2360/149; B60K 2360/186; B60K 2360/822; B60K 35/10; B60K 35/22; B60K 35/265; B60K 35/29; B60K 35/60; B60K 35/26; B60K 2360/143; B60K 2360/195; B60K 35/21; B60K 35/223; B60K 35/235; B60K 35/28; B60K 35/81; B60K 1/00; B60K 3/00; B60K 5/00; B60K 6/00; B60K 7/00; B60K 8/00; B60K 11/00; B60K 13/00; B60K 15/00; B60K 16/00; B60K 17/00; B60K 20/00; B60K 23/00; B60K 25/00; B60K 26/00; B60K 28/00; B60K 31/00; B60K 35/00; B60K 37/00; B60K 2310/00; B60K 2360/00; B60K 2700/00; B60K 2702/00; B60K 2704/00; B60W 2050/146; B60W 2420/403; B60W 2540/22; B60W 2556/45; B60W 50/12; B60W 2040/0872; B60W 2540/00; B60W 2540/225; B60W 40/08; B60W 50/14; B60Y 2302/09; B60Y 2400/92; B60Y 2200/00; B60Y 2300/00; B60Y 2302/00; B60Y 2304/00; B60Y 2306/00; B60Y 2400/00; B60Y 2410/00; G01L 5/06; G02B 2027/0138; G02B 27/0172; G04C 23/16; G06Q 10/109; G06Q 10/08; G06Q 10/08355; G06Q 10/00; G06Q 30/0201; G06Q 30/0251; G06Q 30/0282; G06Q 40/08; G06Q 20/00; G06Q 30/00; G06Q 40/00; G06Q 50/00; G06Q 90/00; G06Q 99/00; G06Q 2220/00; G06Q 2230/00; G06Q 2240/00; G06Q 2250/00; G09G 2354/00; G09G 2358/00; G09G 3/20; G09G 1/00; G09G 3/00; G09G 5/00; G09G 2230/00; G09G 2290/00; G09G 2300/00; G09G 2310/00; G09G 2320/00; G09G 2330/00; G09G 2340/00; G09G 2350/00; G09G 2352/00; G09G 2356/00; G09G 2360/00; G09G 2370/00; G09G 2380/00; G09G 2320/0626; G09G 2330/021; G09G 2340/045; G09G 2340/0464; G09G 2340/14; G09G 2380/10; Y10T 83/04; Y10T 83/852; Y10T 83/8876; Y10T 83/937; Y10T 24/00; Y10T 29/00; Y10T 70/00; G08B 13/2462; G08B 25/08; H04L 67/12

USPC ...... 340/425.5, 426.19, 426.22, 426.26, 438, 340/439, 447, 457.1, 477, 516, 527, 576, 340/539.32, 636.19, 691.6

See application file for complete search history.

(56) References Cited

U.S. PATENT DOCUMENTS

| | | | | |
|---|---|---|---|---|
| 8,669,857 | B2 * | 3/2014 | Sun | B60Q 9/008 |
| | | | | 340/425.5 |
| 8,994,522 | B2 | 3/2015 | Tengler et al. | |
| 9,342,986 | B2 | 5/2016 | Dariush | |
| 9,413,871 | B2 | 8/2016 | Nixon et al. | |
| 10,347,107 | B1 * | 7/2019 | Okezie | G08B 21/06 |
| 10,614,726 | B2 | 4/2020 | Harkness | |
| 10,807,603 | B2 * | 10/2020 | Kochhar | B60W 50/0097 |
| 11,587,461 | B2 | 2/2023 | Telpaz et al. | |
| 11,685,385 | B2 * | 6/2023 | Yang | B60W 40/09 |
| | | | | 340/576 |
| 2012/0215403 | A1 * | 8/2012 | Tengler | B60W 50/12 |
| | | | | 701/36 |
| 2012/0231773 | A1 | 9/2012 | Lipovski | |
| 2015/0031349 | A1 * | 1/2015 | Hill | H04M 1/72463 |
| | | | | 455/418 |
| 2016/0286115 | A1 * | 9/2016 | Levy | H04N 23/661 |
| 2021/0125521 | A1 * | 4/2021 | Telpaz | H04N 7/188 |
| 2023/0242130 | A1 * | 8/2023 | Krause | B60W 50/14 |
| | | | | 701/1 |

* cited by examiner

400

| Ignition On | — 302 |

Display a request to the vehicle driver — 304

Receive real-time driver input from the vehicle driver — 306

Adjust an allowable glance time — 308

Determine a crash risk of the vehicle — 410

Adjust the allowable glance time based on the crash risk — 412

SYSTEMS AND METHODS FOR MANAGING DRIVER GLANCE BEHAVIOR

BACKGROUND

Field

The present disclosure relates generally to systems and methods for monitoring a vehicle driver and, more particularly, to systems and methods for managing driver glance behavior.

Description of the Related Art

Motor vehicles are operated by drivers in various conditions. There exists a variety of distractions in and around the vehicle and the roadway that can draw the attention of the driver away from the direction of travel of the vehicle. Distracted drivers have an increased likelihood of creating dangerous driving conditions, which can cause potential harm to the driver, other vehicle occupants, occupants in nearby vehicles, and/or pedestrians. Modern vehicles are often equipped with driver camera monitoring systems that allow drivers to look away for a short time (e.g., 4 seconds or less) before receiving an alert that they need to look back at the road. However, drivers can become frustrated with the frequency of these alerts in certain driving conditions.

Accordingly, it is desirable to provide systems and methods for monitoring a vehicle driver's activities to increase road and vehicle safety while simultaneously enhancing vehicle user experience and safety.

SUMMARY

In general, one aspect of the subject matter described in this disclosure may be embodied in a system for monitoring a vehicle driver. The system includes a camera operatively disposed in a vehicle and configured to monitor an eye position of the vehicle driver while the vehicle is in operation. The system further includes a display operatively disposed in the vehicle. The system further includes an electronic control unit coupled to the camera and the display. The electronic control unit is configured to operate the display to show a request to the vehicle driver so as to prompt the vehicle driver to provide a driver input. The electronic control unit is further configured to, in response to the vehicle driver providing the driver input, adjust an allowable glance time from a default glance time to an adjusted glance time. The electronic control unit is further configured to determine that the eye position of the vehicle driver is such that a gaze direction of the vehicle driver is not directly towards a direction of travel of the vehicle while the vehicle is in operation. The electronic control unit is further configured to determine that a duration that the gaze direction of the vehicle driver is not directly towards the direction of travel of the vehicle exceeds the adjusted glance time. The electronic control unit is further configured to, in response to determining that the duration that the gaze direction of the vehicle driver is not directly toward the direction of travel of the vehicle exceeds the adjusted glance time, initiate a countermeasure to encourage a response from the vehicle driver.

In another aspect, the subject matter may be embodied in a method for managing driver glance behavior. The method includes operating a vehicle display to show a request to a vehicle driver so as to prompt the vehicle driver to provide a driver input. The method further includes, in response to the vehicle driver providing the driver input, adjusting an allowable glance time from a default glance time to an adjusted glance time (e.g., a longer time than the default glance time). The method further includes determining that an eye position of the vehicle driver is such that a gaze direction of the vehicle driver is not directly towards a direction of travel of a vehicle while the vehicle is in operation. The method further includes determining that a duration that the gaze direction of the vehicle driver is not directly towards the direction of travel of the vehicle exceeds the adjusted glance time. The method further includes, in response to determining that the duration that the gaze direction of the vehicle driver is not directly towards the direction of travel of the vehicle exceeds the adjusted glance time, initiating a countermeasure to encourage a response from the vehicle driver.

In another aspect, the subject matter may be embodied in a non-transitory computer-readable medium having stored contents that cause one or more computing systems to perform automated operations. The automated operations include operating, by the one or more computing systems, a display to show a request to a vehicle driver so as to prompt the vehicle driver to provide a driver input. The automated operations include, in response to the vehicle driver providing the driver input, adjusting, by the one or more computing systems, an allowable glance time from a default glance time to an adjusted glance time. The automated operations include determining, by the one or more computing systems, that an eye position of the vehicle driver is such that a gaze direction of the vehicle driver is not directly towards a direction of travel of a vehicle while the vehicle is in operation. The automated operations include determining, by the one or more computing systems, that a duration that the gaze direction of the vehicle driver is not directly towards the direction of travel of the vehicle exceeds the adjusted glance time. The automated operations include, in response to determining that the duration that the gaze direction of the vehicle driver is not directly towards the direction of travel of the vehicle exceeds the adjusted glance time, initiating, by the one or more computing systems, a countermeasure to encourage a response from the vehicle driver.

These and other embodiments may optionally include one or more of the following features.

In various aspects, the driver input includes an acceptance to an agreement by the vehicle driver.

In various aspects, the driver input includes driver attitude information.

In various aspects, the electronic control unit is further configured to determine a crash or safety risk of the vehicle and adjust the allowable glance time based on the crash or safety risk of the driver and/or the vehicle. The adjusting the allowable glance time based on the crash or safety risk of the vehicle can be performed in real-time to reduce the allowable glance time while the vehicle is in operation by the vehicle driver. The adjusting the allowable glance time can be user-adjusted by an owner of the vehicle (e.g., a parent). The allowable glance time can also be password protected or locked by the owner of the vehicle to enhance safety.

In various aspects, the electronic control unit is further configured to determine a geographic location of the vehicle and adjust the allowable glance time based on the geographic location of the vehicle.

In various aspects, the electronic control unit is further configured to adjust the allowable glance time based on an experience level of the vehicle driver.

In various aspects, the electronic control unit is further configured to adjust the allowable glance time based on temporal data.

In various aspects, the electronic control unit is further configured to adjust the allowable glance time based on real-time vehicle data received from a vehicle sensor.

Various aspects are described in a step-by-step manner. However, the methods described herein can be performed continuously while a vehicle is driving using rolling windows across the incoming vehicle data and/or driver data.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale and may be exaggerated to better illustrate the important features of the present invention.

DETAILED DESCRIPTION

Figure 1:
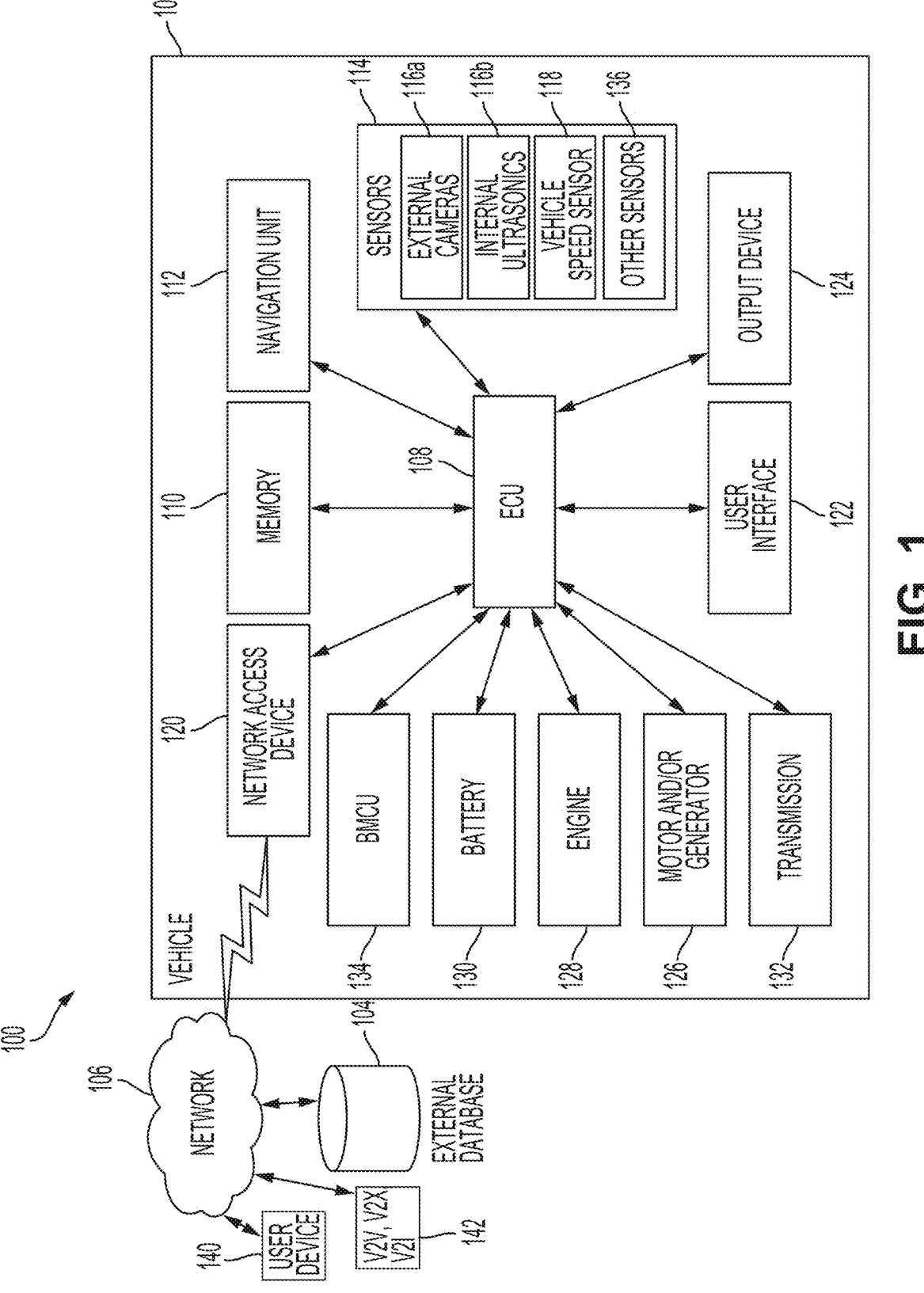
FIG. 1 is a block diagram of an example driver monitoring system according to an aspect of the invention.

Disclosed herein are systems, vehicles, and methods for monitoring a vehicle driver and managing driver glance behavior. A driver monitoring system can include a vehicle internal-facing (e.g., inside the cabin facing the driver) camera, a vehicle display, and a processing unit configured to execute instructions that perform driver monitoring and/or provide driver alerts. The driver monitoring system can monitor a driver's eye and/or head positioning to determine whether the driver's eyes are on the road. The driver monitoring system can allow a driver to look away for a short duration (also referred to herein as an allowable glance time)—for example 1-6 seconds—before activating a driver assistance alert prompting the driver to look ahead or forward.

Aspects of the subject matter described in this disclosure may be implemented to realize one or more of the following advantages. The driver monitoring system can vary the allowable glance time based on various factors, including whether the driver accepts an agreement in exchange for longer glances in lower risk contexts. The "agreement" is a prompt at the beginning of driving where drivers commit to minimizing or eliminating their engagement in nondriving-related tasks in exchange for longer allowable glance times on highways or other roadways. More generally, drivers can agree to not engage in non-driving-related tasks in high-risk contexts in exchange for longer glances in low-risk contexts. The driver monitoring system can tighten glance limits in high-risk contexts upon agreement in exchange for longer glances in lower risk contexts. The driver monitoring system tends to decrease driver engagement in non-driving-related tasks by giving vehicle drivers an incentive of a longer allowable glance time as measured by a driver monitoring system.

In various aspects, the allowable glance time can also be based on the driver's age, health conditions, eye sight, time of day, traffic congestion, quality of the road, speed limit, weather conditions, roadway hazards, type of vehicle, number of passengers in the vehicle, and/or combinations thereof. As an example, if the driver's age is over 60, the allowable glance time is reduced. If there is a lot of traffic congestion, the allowable glance time is reduced. If there is only the driver in the vehicle, the allowable glance time is increased.

The driver monitoring system can be used for L2 (level 2) driving automation, for example, where the purpose of the prompt is to encourage engagement with the driving task and a driver's monitoring of the roadway for hazards. The driver monitoring system can be related to both driver distraction mitigation and L2 driving automation engagement. The driver monitoring system can mitigate driver engagement in non-driving-related tasks in complex, high-risk, roadway environments. The driver monitoring system can mitigate driver disuse or dislike of driver monitoring technology by providing longer limits to the allowed glance time.

The driver monitoring system can utilize supervised machine learning predictive models to take into account vehicle data, survey data, driver behavior data, different environmental factors, and/or circumstances of the environment. The driver monitoring system can utilize a Global Positioning System (GPS) unit for detecting location data including a current location of the vehicle to determine various vehicle traffic, pedestrian traffic, and/or event information of the surrounding environment. In this manner, the driver monitoring system may account for various environmental and/or temporal factors, such as the time of day, the location, the weather, and/or other factors, in determining an appropriate allowable glance time. This allows for a more precise and accurate understanding of different risks levels at different locations, times of day, etc. to accurately determine the appropriate allowable glance time.

Other benefits and advantages include the use of artificial intelligence including machine learning algorithms with models to determine crash or safety risk. By determining crash or safety risk, the driver monitoring system anticipates the risk level to determine an appropriate allowable glance time. For example, the driver monitoring system may alert the driver to encourage a corrective response from the driver to prevent risky driving behavior and encourage the driver to look ahead. In another example, the driver monitoring system may take control of various aspects of the vehicle to prevent risky driving behavior and/or encourage the driver to look ahead. The driver monitoring system may learn from each instance of a driver assistance alert being issued and the driver's reaction thereto.

Various aspects refer to "soft" countermeasures and "hard" countermeasures. In general, "soft" countermeasures refer to those that try to nudge or shape behavior through suggestion or encouragement, while "hard" refer to those that directly modify driver behavior through the vehicle interface (e.g., pedal force, availability of features, etc.).

FIG. 1 is a block diagram of a monitoring system 100 (e.g., a driver monitoring system). The monitoring system 100 may be retrofitted, coupled to, include, or be included within a vehicle 102. The monitoring system 100 may couple, connect to, or include an external database 104. The monitoring system 100 may have a network 106 that links the external database 104 with the vehicle 102. The network 106 may be a local area network (LAN), a wide area network (WAN), a cellular network, the Internet, or combination thereof, that connects, couples and/or otherwise communicates between the vehicle 102 and the external database 104.

The monitoring system 100 can monitor a driver's eye and/or head positioning to determine whether the driver's eyes are on the road. The driver monitoring system 100 can allow a driver to look away for a predetermined glance time before activating a driver assistance alert prompting the driver look ahead or forward.

The monitoring system 100 may include or be retrofitted or otherwise coupled with the vehicle 102. The vehicle 102 is a conveyance capable of transporting a person, an object, or a permanently or temporarily affixed apparatus. The vehicle 102 may be a self-propelled wheeled conveyance, such as a car, a sports utility vehicle, a truck, a bus, a van or other motor, battery or fuel cell driven vehicle. For example, the vehicle 102 may be an electric vehicle, a hybrid vehicle, a hydrogen fuel cell vehicle, a plug-in hybrid vehicle or any other type of vehicle that has a fuel cell stack, a motor, and/or a generator. Other examples of vehicles include bicycles, trains, planes, or boats, and any other form of conveyance that is capable of transportation. The vehicle 102 may be semi-autonomous or autonomous. That is, the vehicle 102 may be self-maneuvering and navigate without human input. An autonomous vehicle may have and use one or more sensors and/or a navigation unit to drive autonomously.

The monitoring system 100 includes one or more processors, such as an electronic control unit (ECU) 108 and a memory 110. The monitoring system 100 may include other components, such as a navigation unit 112, one or more sensors 114 including one or more external cameras 116*a*, one or more internal cameras 116*b*, a vehicle speed sensor 118, and/or other sensors 136, a network access device 120, a user interface 122 and/or an output device 124. Other sensors 136 can include radars, ultrasonics, LiDAR, microphones, etc. The monitoring system 100 may couple, connect to, and/or include one or more vehicle components such as the motor and/or generator 126, the engine 128, the battery 130, the transmission 132 and/or the battery management control unit (BMCU) 134.

The ECU 108 may be implemented as a single ECU or as multiple ECUs. The ECU 108 may be electrically coupled to some or all of the other components within the vehicle 102, such as the motor and/or generator 126, the transmission 132, the engine 128, the battery 130, the battery management control unit (BMCU) 134, the memory 110, the network access device 120, and/or the one or more sensors 114. The ECU 108 can monitor the vehicle 102 and/or a driver of the vehicle 102. The ECU 108 can include one or more processors or controllers specifically designed for monitoring driver eye and/or head positioning. The ECU 108 can issue a driver assistance alert in response to a driver glancing away from the road ahead for more than a predetermined duration. The ECU 108 can be configured to determine an appropriate maximum allowable glance time based on a variety of factors as discussed herein.

The ECU 108 can interface with different countermeasures for encouraging a driver to maintain focus ahead of the vehicle and thereby reduce risky driving. The ECU 108 can employ a "soft" countermeasure, such as prompts to get the driver to look at the road or encouragement to use driving automation features to maintain safe distances. The ECU 108 can employ a "hard" countermeasure, such as reducing a speed of the vehicle 102 and/or increasing a following distance of the vehicle 102 with respect to a lead vehicle.

The ECU 108 can further use driver data, vehicle data, environmental data, and/or temporal data to help determine a crash or safety risk. The maximum allowable glance time can be decreased with increased crash or safety risk. For example, the ECU 108 can analyze vehicle data, which can include parameters of the vehicle 102 (e.g., speed, GPS location, acceleration, etc.) and/or external environment parameters of the vehicle 102 (e.g., surrounding vehicles, buildings, pedestrians, weather, road conditions, etc.) to determine an appropriate maximum allowable glance time. For example, the maximum allowable glance time can be reduced in heavy traffic and/or on surface streets which typically have more intersections, pedestrians, etc., whereas the maximum allowable glance time can be increased in light traffic and/or on highways or freeways which typically have less intersections, pedestrians, etc. If the maximum allowable glance time is exceeded, the ECU 108 may issue a driver assistance alert to prompt the driver to look ahead to mitigate the risky driving behavior. In various aspects, the ECU 108 can utilize a machine learning algorithm to determine the crash or safety risk. The ECU 108 may be coupled to a memory 110 and execute instructions that are stored in the memory 110.

The memory 110 may be coupled to the ECU 108 and store instructions that the ECU 108 executes. The memory 110 may include one or more of a Random Access Memory (RAM) or other volatile or non-volatile memory. The memory 110 may be a non-transitory memory or a data storage device, such as a hard disk drive, a solid-state disk drive, a hybrid disk drive, or other appropriate data storage, and may further store machine-readable instructions, which may be loaded and executed by the ECU 108. Moreover, the memory 110 may be used to record and store data before, after, and/or during the occurrence of the risky driving behavior.

The monitoring system 100 may include a user interface 122. The monitoring system 100 may display one or more notifications on the user interface 122. The one or more notifications on the user interface 122 may notify occupants of the vehicle when the monitoring system 100 is initialized or activated. The user interface 122 may include an input/output device that receives user input from a user interface element, a button, a dial, a microphone, a keyboard, or a touch screen. For example, the user interface 122 may receive user input that may include confirmation of acceptance of an agreement. Other configurations may include a preference for the magnitude or the type of countermeasure for mitigating risky driver behavior, for example. The user interface 122 may provide an output to an output device 124, such as a display, a speaker, an audio and/or visual indicator, or a refreshable braille display. For example, the user interface 122 may display an alert, a warning, or a specific countermeasure being taken by the ECU 108.

The monitoring system 100 may include a network access device 120. The network access device 120 may include a communication port or channel, such as one or more of a Wi-Fi unit, a Bluetooth® unit, a radio frequency identification (RFID) tag or reader, or a cellular network unit for accessing a cellular network (such as 3G, 4G or 5G). The network access device 120 may transmit data to and receive data from the external database 104. For example, the ECU 108 may communicate with the external database 104 to obtain a baseline model and/or a predictive algorithm that considers activities and/or objects at a current location of the vehicle 102, via the network 106. The monitoring system 100 may use the baseline model and/or the predictive algorithm to determine a crash or safety risk of the vehicle 102.

The network access device 120 may transmit data to and receive data from a user device 140 (e.g., a smart phone, a tablet, a personal computer, etc.) which can be located remotely from the vehicle 102. The monitoring system 100 may display one or more notifications on the user device 140, similar to user interface 122. Accordingly, the user device 140 can have a user interface whereby a user can communicate with the ECU 108 from a remote location.

The network access device 120 may transmit data to and receive data from other databases 142, for example using vehicle-to-vehicle (V2V) communication, vehicle-to-everything (V2X), and/or vehicle-to-infrastructure (V2I). For example, monitoring system 100 can enable vehicle 102 to exchange vehicle data with a second vehicle using V2V communication technology. Monitoring system 100 can receive location data such as traffic congestion, weather advisories, bridge clearance levels, traffic light status, and/or crime data to inform the monitoring system 100 of conditions at or near the location of the vehicle 102 or a location where the vehicle 102 is headed using V2I and/or V2X communication technology. Accordingly, the vehicle 102 may communicate with another vehicle or a network using vehicle-to-vehicle communications or vehicle-to-infrastructure communications via the network access device 120.

The monitoring system 100 may further include a navigation unit 112. The navigation unit 112 may be integral to the vehicle 102 or a separate unit coupled to the vehicle 102, such as a personal device with navigation capabilities. When the navigation unit 112 is separate from the vehicle 102, the navigation unit 112 may communicate with the vehicle 102 via the network access device 120. In some implementations, the vehicle 102 may include a GPS unit for detecting location data including a current location of the vehicle 102 and date/time information instead of the navigation unit 112. In that regard, the ECU 108 may perform the functions of the navigation unit 112 based on data received from the GPS unit. At least one of the navigation unit 112 or the ECU 108 may predict or propose a route set that includes a starting location and a destination location. The navigation unit 112 or the ECU 108 may perform navigation functions. Navigation functions may include, for example, route and route set prediction, providing navigation instructions, and receiving user input such as verification of predicted routes and route sets or destinations. Other information, such as a current speed of the vehicle 102, may be extrapolated, interpreted, or otherwise calculated from the data obtained from the navigation unit.

The navigation unit 112 may provide and obtain navigational map information including location data, which may include a current location, a starting location, a destination location and/or a route between the starting location or current location and the destination location of the vehicle 102. The navigation unit 112 may include a memory (not shown) for storing the route data. The navigation unit 112 may receive data from other sensors capable of detecting data corresponding to location information. For example, the other sensors may include a gyroscope or an accelerometer.

The navigational map information may include entity information. The entity information may include locations or places of interest, such as government buildings, commercial businesses, schools, tourist attractions, or other places of interest. These different entities may be a factor in determining crash or safety risk.

The monitoring system 100 may further include one or more sensors 114. The one or more sensors 114 may include one or more external cameras 116a, one or more internal cameras 116b, a vehicle speed sensor 118, and/or other sensors 136.

The one or more external cameras 116a can be positioned along the exterior of the vehicle 102, such as along the roof, the trunk, the sides, and/or the front of the vehicle 102. The positions of the external cameras 116a can vary depending on the type of vehicle, among other factors. The different views of the surrounding environment may be used to form a panoramic or 360-degree image of the surrounding environment outside the vehicle 102, which allows the monitoring system 100 to detect other vehicles and/or objects outside the vehicle 102, such as vehicles in front, alongside, or behind the vehicle 102. The one or more external cameras 116a may capture image data that includes a single frame or image or a continuous video of the surrounding environment outside the vehicle 102.

Figure 2A:
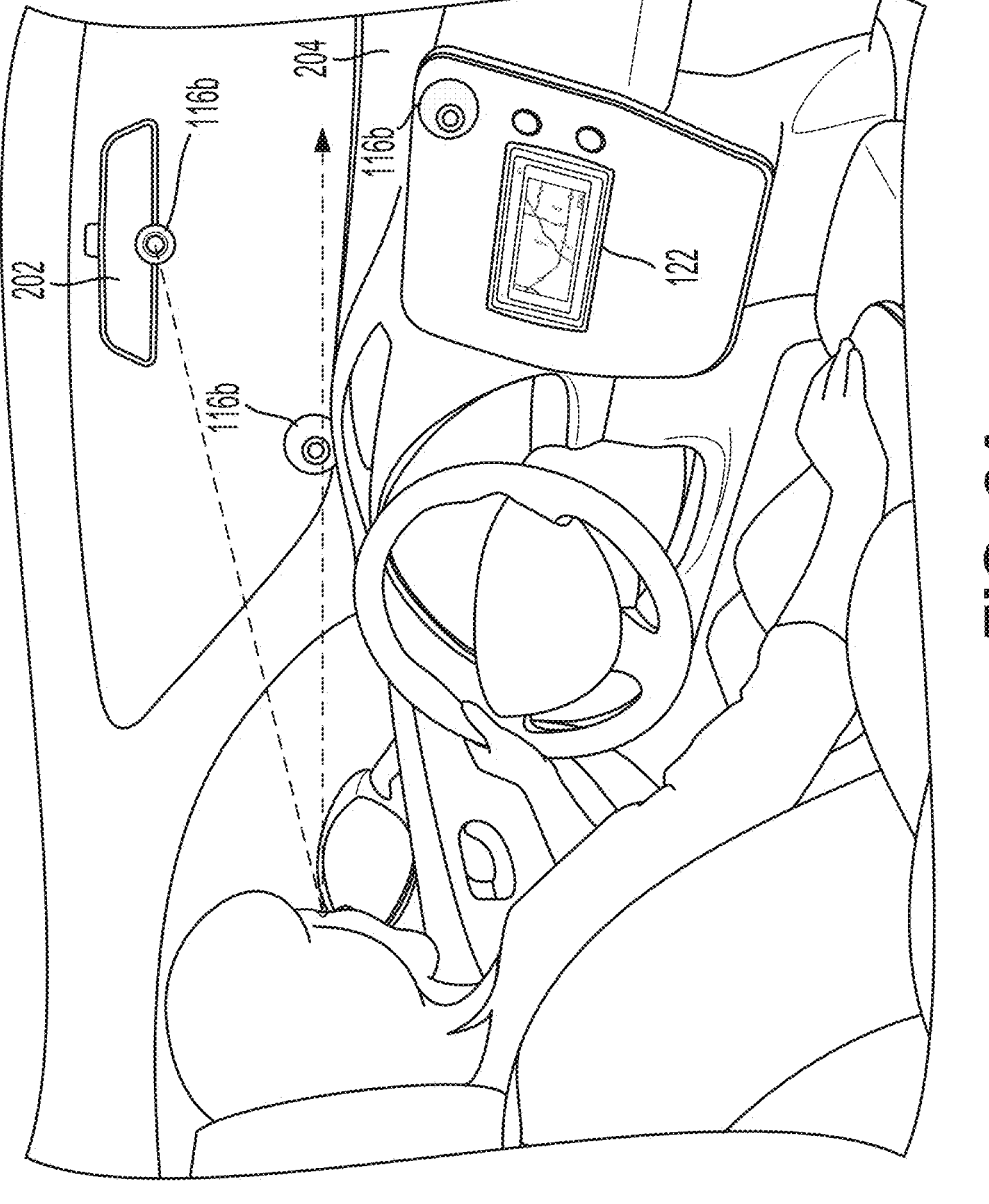
FIG. 2A and FIG. 2B show example illustrations of the positioning of one or more internal cameras of the driver monitoring system of FIG. 1 within the vehicle, with a gaze direction of the vehicle driver toward a direction of travel of the vehicle and not toward a direction of travel of the vehicle, respectively, according to an aspect of the invention.

The one or more internal cameras 116b may include multiple cameras positioned within the vehicle 102 to capture different views within the cabin of the vehicle 102, as shown in FIG. 2A for example. The one or more internal cameras 116b may be positioned within the vehicle 102, such as on the rearview mirror 202, in or on the dashboard 204, on or near the visor, or any other suitable location that can capture the face/body of the driver and/or passengers. The one or more internal cameras 116b may capture images that includes a single frame or image or a continuous video of the environment inside or within the vehicle 102.

In an example, the ECU 108 can utilize an internal camera 116b as an eye-tracking device to monitor an eye position of the vehicle driver while the vehicle is in operation. For instance, the one or more internal cameras 116b may be used to measure the driver's eye position (e.g., the point of gaze) and the movement of the driver's eyes (e.g., the motion of the eyes relative to the driver's head). This can be accomplished by utilizing a facial imaging camera which may be placed inside the vehicle interior in any position that is in front of (either directly or peripherally) the vehicle driver. Examples positions for the facial imaging camera include on the rearview mirror 202, on the dashboard 204, on the mounting stem of the steering wheel, or the like. The one or more internal cameras 116b can be configured to take images or video of the vehicle driver's face while driving, and the ECU 108 is configured to extract the driver's eye position from the images/video.

In various aspects, the movement of the driver's eyes is determined by light (such as infrared light) reflected from the cornea of the eye, which is sensed by a suitable electronic device (which can be part of the one or more internal cameras 116b) or an optical sensor. The information pertaining to the eye motion can be utilized (e.g., by the ECU 108, shown in FIG. 1, associated with the one or more internal cameras 116b) to determine the rotation of the driver's eyes based on changes in the reflected light. In various aspects, the ECU 108 is configured to estimate an eye position of the vehicle driver while the vehicle is in operation by monitoring a head position of the driver. For example, it can be assumed that the driver is looking downward in response to the ECU 108 detecting, via the one or more internal cameras 116b, that the driver's head is tilted downward (e.g., see FIG. 2B).

The one or more sensors 114 may include a vehicle speed sensor 118. The vehicle speed sensor 118 may measure the amount of rotation of the multiple wheels to determine whether the vehicle 102 is stationary and/or parked.

The one or more sensors 114 may include other sensors 136 to measure the road condition, the weather, the ambient lighting surrounding the vehicle 102, and/or other environmental factors that may be used to determine crash or safety risk. The other sensors 136 can include one or more external ultrasonic sensors positioned on the outside of the vehicle 102 and/or within the vehicle 102 but directed outward to capture different views of the surrounding environment outside the vehicle 102. The ultrasonic sensors can be used to detect other vehicles and/or objects outside the vehicle 102, such as vehicles in front, alongside, or behind the vehicle 102. The other sensors 136 can include a gyroscope and/or accelerometer for measuring attitude and/or acceleration of the vehicle 102.

The monitoring system 100 may include an output device 124. The output device 124 may be an audio indicator, a visual indicator, a communication device, or other output device. The audio or visual indicator may be used to sound an alarm or flash an alarm, respectively, for example.

The monitoring system 100 may couple, connect to, and/or include one or more vehicle components. The one or more vehicle components may include a motor and/or generator 126. The motor and/or generator 126 may convert electrical energy into mechanical power, such as torque, and may convert mechanical power into electrical energy. The motor and/or generator 126 may be coupled to the battery 130. The motor and/or generator 126 may convert the energy from the battery 130 into mechanical power, and may provide energy back to the battery 130, for example, via regenerative braking. In some implementations, the vehicle 102 may include one or more additional power generation devices such as the engine 128 or a fuel cell stack (not shown). The engine 128 combusts fuel to provide power instead of and/or in addition to the power supplied by the motor and/or generator 126.

The battery 130 may be coupled to the motor and/or generator 126 and may provide electrical energy to and receive electrical energy from the motor and/or generator 126. The battery 130 may include one or more rechargeable batteries.

The BMCU 134 may be coupled to the battery 130 and may control and manage the charging and discharging of the battery 130. The BMCU 134, for example, may measure, using battery sensors, parameters used to determine the state of charge (SOC) of the battery 130. The BMCU 134 may control the battery 130.

The one or more vehicle components may include the transmission 132. The transmission 132 may have different gears and/or modes, such as park, drive and/or neutral and may shift between the different gears. The transmission 132 manages the amount of power that is provided to the wheels of the vehicle 102 given an amount of speed.

The monitoring system 100 may include or be coupled to the external database 104. A database is any collection of pieces of information that is organized for search and retrieval, such as by a computer, and the database may be organized in tables, schemas, queries, reports, or any other data structures. A database may use any number of database management systems. The external database 104 may include a third-party server or website that stores or provides information. The information may include real-time information, periodically updated information, or user-inputted information. A server may be a computer in a network that is used to provide services, such as accessing files or sharing peripherals, to other computers in the network.

The external database 104 may store personalized driver data, for example driver behavior history, driver survey data, etc. The external database 104 may be updated and/or provide updates in real-time. The external database 104 may store and/or provide the driver data to the ECU 108. The external database 104 may also store environmental factors, such as weather information or time of day information, and provide the environmental factors to the ECU 108 to assist in determining crash or safety risk. The weather information may include the temperature, weather, road conditions, amount of precipitation, and/or other weather factors that may affect the crash or safety risk. For example, cold weather, precipitation, and/or nighttime driving can increase crash or safety risk, whereas fair weather and/or daytime driving can decrease crash or safety risk. Accordingly, the ECU 108 can be configured to adjust the allowable glance time based on a temporal data (e.g., time of day, time of year, etc.). As another example, personalized driver data that indicates that a driver has historic risky driving behavior at certain geographical locations, the monitoring system 100 can determine and/or be more likely to determine higher crash or safety risk as the driver approaches these geographical locations. The monitoring system 100 can reduce an allowable glance time in real-time as the vehicle 102 approaches high crash or safety risk areas.

Figure 3:
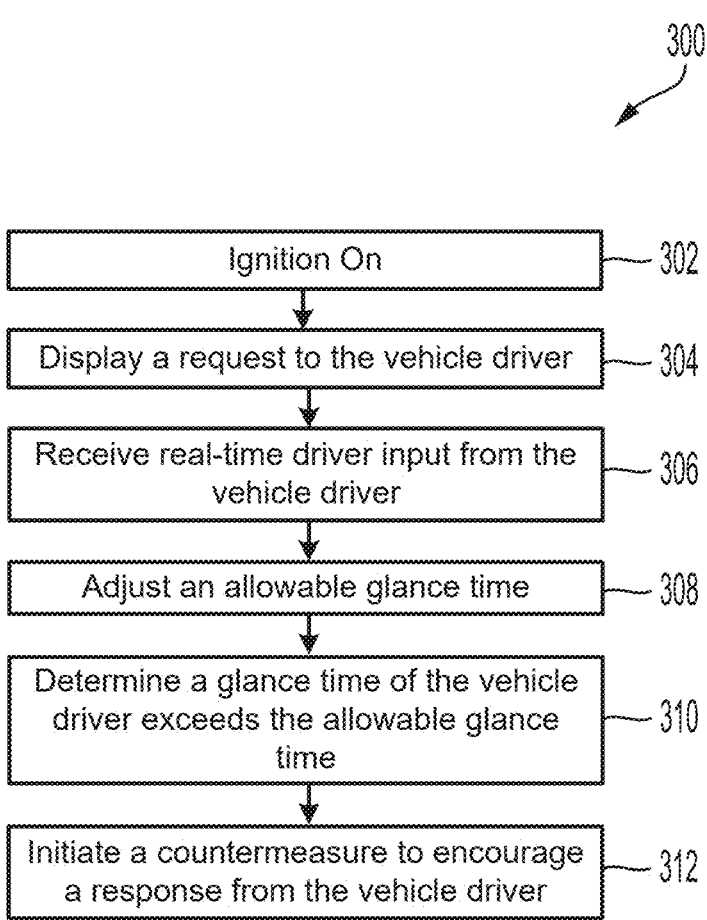
FIG. 3 is a flow diagram of an example process for managing driver glance behavior using the driver monitoring system of FIG. 1 according to an aspect of the invention.

FIG. 3 is a flow diagram of an example process 300 for managing driver glance behavior. One or more computers or one or more data processing apparatuses, for example, the ECU 108 of the monitoring system 100 of FIG. 1, appropriately programmed, may implement the process 300.

With combined reference to FIG. 1 and FIG. 3, the ECU 108 can detect an ignition of the vehicle 102 is turned on (302).

The ECU 108 can operate the output device 124 (e.g., a display) to show a request to the vehicle driver so as to prompt the vehicle driver to provide a driver input (304).

The ECU 108 can receive an input from the vehicle driver in real-time (306). The vehicle driver can provide the driver input via the user interface 122. In various aspects, the request displayed at step 304 is an agreement and the driver input is an acceptance of the agreement. For example, the driver can select an icon, toggle, button, or the like confirming the agreement. Accordingly, the monitoring system 100 provides a prompt upon entering the vehicle and/or pushing the ignition switch, which can be displayed in the cluster or center stack. The prompt can have the driver agree to a safe driving behavior (e.g., adhering to speed limits, not engaging in non-driving-related tasks, etc.) in exchange for longer allowable glance times from the driver camera monitoring system or shorter glance times during high-risk scenarios.

In various aspects, the prompted agreement can minimally include a written description of the driver's responsibility in minimizing their performance of non-driving related tasks as well as the changes to the allowable glance times depending on the context. The prompted agreement can use messaging that uses social norms (e.g., "safe drivers do not perform non-driving-related tasks in these contexts") or safety (e.g., "[number of people]died in crashes from driver distraction last year"). The prompted agreement can include surveys to gauge the appropriate glance allowance for the driver. The prompted agreement can include training modules that guide the driver on how to manage their glances given the context prior to the agreement.

In various aspects, the driver input can include data representing the driver's attitude(s) about risky driving behavior, view(s) toward social norms of risky driving behavior, sensation seeking rating(s), and/or impulsiveness rating(s). For example, the request can include a survey asking the driver to provide personalized driver data indicative of a personality and/or attitude of the driver.

The ECU 108 can adjust an allowable glance time from a default glance time to an adjusted glance time (308). In various aspects, the adjusted glance time is greater than the default glance time. Step 308 can be performed in response to the vehicle driver providing the driver input at step 306.

Figure 2B:
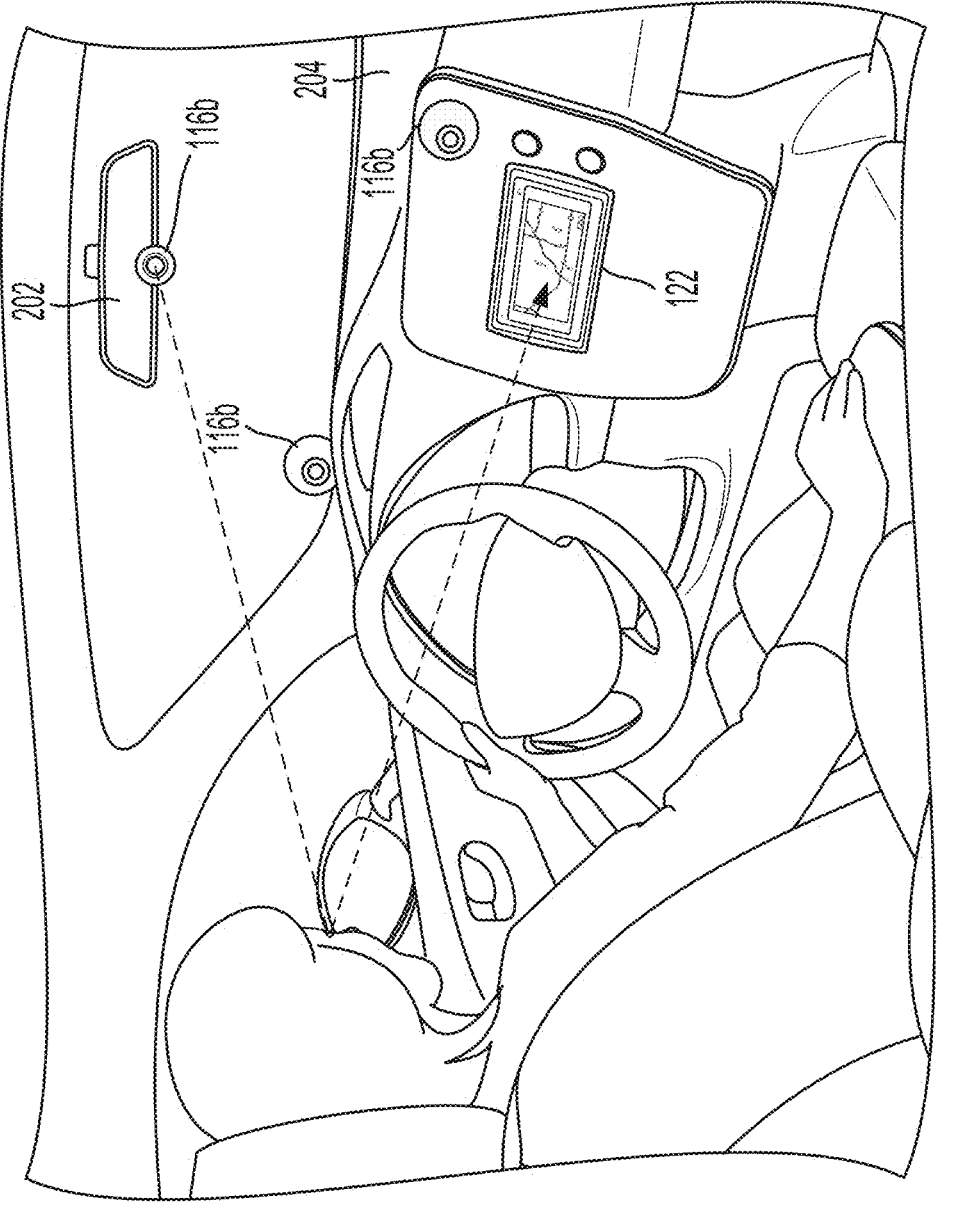

The ECU 108 can determine that a glance time of the vehicle driver exceeds the allowable glance time (310) while the driver is operating the vehicle. Stated differently, the ECU 108 can determine that a duration that the gaze direction of the vehicle driver is not toward the direction of travel of the vehicle exceeds the adjusted glance time. For example, the ECU 108 can determine that the eye position of the driver of the vehicle is such that a gaze direction of the driver is not toward a direction of travel of the vehicle while the vehicle is in operation. For example, FIG. 2B shows the vehicle driver looking down at a user interface 122 such that the eye position of the vehicle driver is such that a gaze direction of the vehicle driver is not toward a direction of travel of the vehicle while the vehicle is in operation. In contrast, FIG. 2A shows the vehicle driver looking ahead through the windshield such that the eye position of the vehicle driver is such that a gaze direction of the vehicle driver is (e.g., directly) toward a direction of travel of the vehicle while the vehicle is in operation. The ECU 108 can monitor the gaze direction of the vehicle driver in real-time while the vehicle driver is operating the vehicle using one or more internal cameras 116b.

In response to the vehicle driver maintaining an eye position not toward a direction of travel of the vehicle for a duration that exceeds the adjusted glance time, the ECU 108 can initiate a countermeasure to encourage a response from the vehicle driver (312). In various aspects, the ECU 108 can be configured to implement a "soft" countermeasure, for example by displaying a warning or behavioral nudge. Stated differently, the monitoring system 100 may operate or control one or more vehicle components in response to detecting the driver glance time exceeds the allowable glance time. For example, with momentary reference to FIG. 1, the ECU 108 can send a warning signal to the user interface 122 and/or the output device 124 to encourage the driver to pay attention to the roadway. The warning signal can be a visual signal (e.g., a light on a vehicle dash cluster), an audio signal, and/or a haptic signal (e.g., a vibration within the driver's seat and/or steering wheel that provides a tactile alert to the driver).

An example soft countermeasure can include displaying a message to a driver, such as "keep eyes ahead on roadway." The soft countermeasure can encourage the driver to use driver convenience systems (e.g., adaptive cruise control, lane keeping assist, etc.). The soft countermeasure can include other alerts, warnings, HMI (human-machine interface), etc. as desired.

The monitoring system 100 can determine whether the vehicle driver responded to the countermeasure within a predetermined duration. The monitoring system 100 can store personalized driver data that includes a history of the vehicle driver's response to historical countermeasures that were activated by the monitoring system 100. Generally, the monitoring system 100 can penalize drivers who do not comply with the countermeasure with shorter allowable glance times whereas compliant drivers may be rewarded with less strict (i.e., longer) allowable glance times. The allowable glance times may be changed in real-time.

Figure 4:
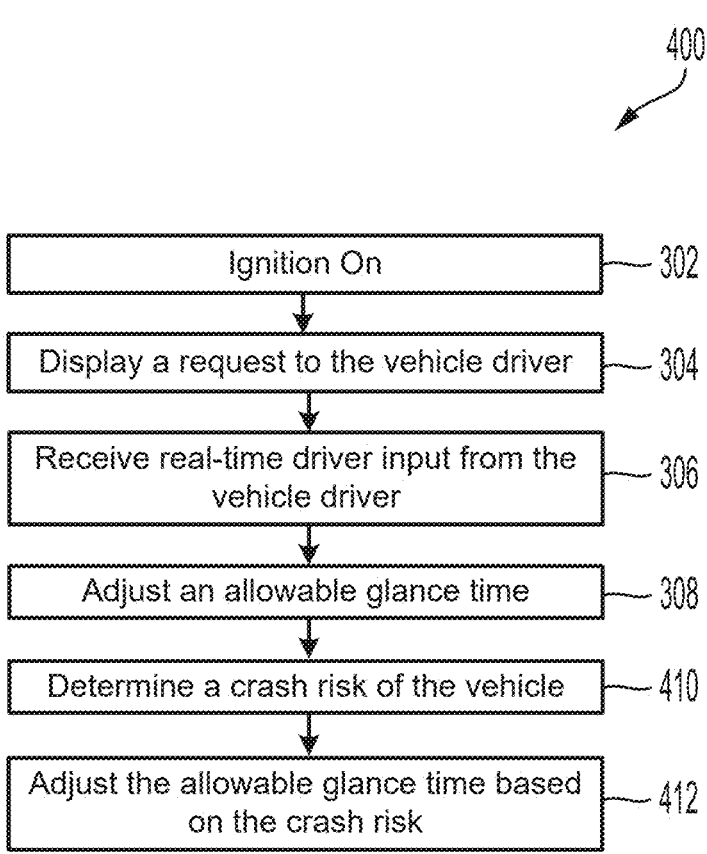
FIG. 4 is a flow diagram of an example process for managing driver glance behavior using the driver monitoring system of FIG. 1 according to an aspect of the invention.

FIG. 4 is a flow diagram of an example process 400 for managing driver glance behavior. One or more computers or one or more data processing apparatuses, for example, the ECU 108 of the monitoring system 100 of FIG. 1, appropriately programmed, may implement the process 300. With respect to FIG. 4, elements with like element numbering, as depicted in FIG. 3, are intended to be the same or similar and will not necessarily be repeated for the sake of clarity.

With combined reference to FIG. 1 and FIG. 4, the ECU 108 can determine a crash or safety risk of the vehicle (410). The ECU 108 can determine a measurement of crash or safety risk in a specific geographic location of the vehicle 102 (or a geographic location that the vehicle 102 is approaching) based on environmental characteristics (e.g., other vehicles, speed, historical crash data, etc.). The ECU 108 can adjust the allowable glance time based on the estimated crash or safety risk (e.g., allowable glance time can increase with decreased crash or safety risk). For example, younger drivers might receive less allowable glance time from agreement with the prompt due to higher risk among their demographics. In addition, the allowable glance time may vary based on following distance from a lead vehicle or the relative speed of the vehicle (e.g., allowable glance time decreases with decreased following distance). The crash or safety risk can be based on historical crash data at a particular intersection or geographic location. The crash or safety risk can vary based on temporal data (e.g., time of day or time of year). For example, the crash or safety risk can be greater at nighttime when the driver's visibility is limited. The crash or safety risk can vary based on other environmental characteristics, such as surrounding vehicles, weather, etc.

The ECU 108 can adjust the allowable glance time based on the crash or safety risk determined in step 410 (412). This adjustment can be performed in real-time while the vehicle is travelling on the roadway. In this manner, the allowable glance time can be personalized in real-time based on driver data, vehicle data, and/or other geographic and/or temporal data. The ECU 108 can operate the monitoring system 100 (e.g., by controlling when to activate a countermeasure) based on the adjusted allowable glance time.

The monitoring system 100 can determine a measurement of crash or safety risk in a specific location based on environmental characteristics (e.g., other vehicles, speed, historical crash or safety data, etc.). The monitoring system 100 can include personalization to adjust the allowable glance time or the differences in the allowable glance time upon agreement with the prompt. For example, younger drivers (e.g., ages 18-25 years old) might receive less allowable glance time from agreement with the prompt due to higher risk among their demographics. Accordingly, the ECU 108 can be configured to adjust the allowable glance time based on an experience level of the vehicle driver. In addition, the differences may change based on following distance from a lead vehicle or the relative speed of the vehicle. Further, these contextual variables may serve as indicators of a driver's abuse of this feature, resulting in glance time tolerance returning to the original state.

The ECU 108 can be configured to determine a geographic location of the vehicle and adjust the allowable glance time based on the geographic location of the vehicle. For example, the allowable glance time can be increased on highways and/or freeways where there are less intersections, pedestrians, and/or distractions. In contrast, the allowable glance time can be limited and/or decreased on surface streets where there are more intersections, pedestrians, and/or distractions. Moreover, certain geographic locations can be known and/or anticipated to carry lower or higher risk and the allowable glance time can be adjusted accordingly.

Compliance with the prompted agreement during driving can be used to provide feedback at the end of the drive, leveraging the prompted agreement, with the adjustments that would be implemented in the future based on their compliance. Generally, drivers who do not comply with the agreement would see stricter (i.e., shorter) allowable glances whereas compliant drivers may be given less strict (i.e., longer) allowable glances.

In various aspects, personalization may be done by resorting to suitable learning algorithms, e.g., reinforcement learning (RL). The driver can be rewarded with more glance off-road time if feedback based on the contextual variables confirms observance of a safe driving behavior. Glance off-road time can be reduced if feedback based on the contextual variables indicates that the driver abuses the system by engaging in unsafe driving behavior (negative or zero reward is used in RL).

Allowable glance times can also be used to inform ADAS (Advanced Driver Assistance Systems) alerts. An example would be LDA (Lane Departure Alert) visual alerts. For example, if a driver is currently allowed longer allowable glance times to non-driving-related tasks, then the monitoring system 100 can cause the LDA visual alert to be kept on the screen longer to allow extra time for the driver to see the LDA visual alert.

In various aspects, the system's algorithm defines allowable glance time for a given driver which can be contingent upon a driver's visual scanning patterns of the road environment such that "good" visual scanning patterns are awarded with longer allowable glance times and "poor" visual scanning patterns are awarded with shorter allowable glance times. Good visual scanning patterns may be defined by wider visual and horizontal gaze dispersion of the traffic environment, higher frequencies of looking at the rearview and side mirrors, etc. Poor visual scanning patterns may be defined by limited visual and horizontal gaze dispersion (e.g., visual angle deviations greater than 30 degrees) of the traffic environment, lower frequencies of looking at the rearview and side mirrors, etc.

Favorable improvements in glancing can be confirmed/correlated with vehicle behavior observations so that consistency of safe behavior can be rewarded by allowing the driver even more eyes-off-road time. The driver can be rewarded (or discouraged), whether through more complex glancing algorithms implemented in DMS (dealer management system) or by safe driving confirmations (feedback at the end of the drive). Confirmations of safe driving behavior can be most relevant to promote safe driving, whereas measuring glance quality or quality of visual scanning tends to be not only a difficult problem but also not the desired outcome (Cf. visual scanning patterns of a driver who is not driving consciously, as if on an autopilot).

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

14

What is claimed is:

1. A system for monitoring a vehicle driver, comprising:
a camera operatively disposed in a vehicle and configured to monitor an eye position of the vehicle driver while the vehicle is in operation;
a display operatively disposed in the vehicle;
an electronic control unit coupled to the camera and the display, and configured to:
operate the display to show a request to the vehicle driver so as to prompt the vehicle driver to provide a driver input;
in response to the vehicle driver providing the driver input, adjust an allowable glance time from a default glance time to an adjusted glance time;
determine that the eye position of the vehicle driver is such that a gaze direction of the vehicle driver is not toward a direction of travel of the vehicle while the vehicle is in operation;
determine that a duration that the gaze direction of the vehicle driver is not toward the direction of travel of the vehicle exceeds the adjusted glance time; and
in response to determining that the duration that the gaze direction of the vehicle driver is not toward the direction of travel of the vehicle exceeds the adjusted glance time, initiate a countermeasure to encourage a response from the vehicle driver.

2. The system of claim 1, wherein the driver input includes an acceptance to an agreement by the vehicle driver.

3. The system of claim 1, wherein the driver input includes driver attitude information.

4. The system of claim 1, wherein the electronic control unit is further configured to:
determine a crash or safety risk of the vehicle; and
adjust the allowable glance time based on the crash or safety risk of the vehicle.

5. The system of claim 1, wherein the electronic control unit is further configured to:
determine a geographic location of the vehicle; and
adjust the allowable glance time based on the geographic location of the vehicle.

6. The system of claim 1, wherein the electronic control unit is further configured to adjust the allowable glance time based on an experience level of the vehicle driver.

7. The system of claim 1, wherein the electronic control unit is further configured to adjust the allowable glance time based on a temporal data.

8. The system of claim 1, wherein the electronic control unit is further configured to adjust the allowable glance time based on real-time vehicle data received from a vehicle sensor.

9. A method for managing driver glance behavior, comprising:
operating a vehicle display to show a request to a vehicle driver so as to prompt the vehicle driver to provide a driver input;
in response to the vehicle driver providing the driver input, adjusting an allowable glance time from a default glance time to an adjusted glance time;
determining that an eye position of the vehicle driver is such that a gaze direction of the vehicle driver is not toward a direction of travel of a vehicle while the vehicle is in operation;
determining that a duration that the gaze direction of the vehicle driver is not toward the direction of travel of the vehicle exceeds the adjusted glance time; and
in response to determining that the duration that the gaze direction of the vehicle driver is not toward the direction of travel of the vehicle exceeds the adjusted glance time, initiating a countermeasure to encourage a response from the vehicle driver.

10. The method of claim 9, wherein the driver input includes at least one of:

an acceptance to an agreement by the vehicle driver; or a driver attitude information.

11. The method of claim 9, further comprising:

determining a crash or safety risk of the vehicle; and adjusting the allowable glance time based on the crash or safety risk of the vehicle.

12. The method of claim 9, further comprising:

determining a geographic location of the vehicle; and adjusting the allowable glance time based on the geographic location of the vehicle.

13. The method of claim 9, further comprising adjusting the allowable glance time based on an experience level of the vehicle driver.

14. The method of claim 9, further comprising adjusting the allowable glance time based on a temporal data.

15. The method of claim 9, further comprising adjusting the allowable glance time based on real-time vehicle data received from a vehicle sensor.

16. A non-transitory computer-readable medium having stored contents that cause one or more computing systems to perform automated operations, the automated operations including at least:

operating, by the one or more computing systems, a display to show a request to a vehicle driver so as to prompt the vehicle driver to provide a driver input;

in response to the vehicle driver providing the driver input, adjusting, by the one or more computing systems, an allowable glance time from a default glance time to an adjusted glance time;

determining, by the one or more computing systems, that an eye position of the vehicle driver is such that a gaze direction of the vehicle driver is not toward a direction of travel of a vehicle while the vehicle is in operation;

determining, by the one or more computing systems, that a duration that the gaze direction of the vehicle driver is not toward the direction of travel of the vehicle exceeds the adjusted glance time; and in response to determining that the duration that the gaze direction of the vehicle driver is not toward the direction of travel of the vehicle exceeds the adjusted glance time, initiating, by the one or more computing systems, a countermeasure to encourage a response from the vehicle driver.

17. The non-transitory computer-readable medium of claim 16, wherein the automated operations further include:

determining, by the one or more computing systems, a crash or safety risk of the vehicle; and adjusting, by the one or more computing systems, the allowable glance time based on the crash or safety risk of the vehicle.

18. The non-transitory computer-readable medium of claim 17, wherein the adjusting, by the one or more computing systems, the allowable glance time based on the crash or safety risk of the vehicle is performed in real-time to reduce the allowable glance time while the vehicle is in operation by the vehicle driver.

19. The non-transitory computer-readable medium of claim 16, wherein the automated operations further include:

determining, by the one or more computing systems, a geographic location of the vehicle; and adjusting, by the one or more computing systems, the allowable glance time based on the geographic location of the vehicle.

20. The non-transitory computer-readable medium of claim 16, wherein the automated operations further include adjusting, by the one or more computing systems, the allowable glance time based on at least one of an experience level of the vehicle driver, a temporal data, or a vehicle data received from a vehicle sensor.

* * * * *